United States Patent [19]

Mace

[11] Patent Number: 4,793,624

[45] Date of Patent: Dec. 27, 1988

[54] SMALL, LIGHTWEIGHT, STRONG, MULTIPLE USE CART HAVING A REMOVABLE VERTICAL SUPPORT FOR MOVING HEAVY ITEMS IN OR OUT OF DWELLINGS VIA A PERSON SIZE DOORWAY

[76] Inventor: Ted C. Mace, 15129 S.E. 139th Pl., Renton, Wash. 98056

[21] Appl. No.: 100,593

[22] Filed: Sep. 24, 1987

[51] Int. Cl.$^4$ .............................................. B62B 3/02
[52] U.S. Cl. ............................. 280/47.16; 280/472; 280/47.34; 280/79.1 A; D34/12
[58] Field of Search ............... 280/47.16, 47.2, 47.34, 280/47.37 R, 79.1 R, 79.1 A, 79.3; D34/12, 17, 18, 24

[56] References Cited

U.S. PATENT DOCUMENTS

| | | | |
|---|---|---|---|
| 2,070,095 | 2/1937 | Shepard, Jr. et al. | 280/47.34 |
| 3,003,788 | 10/1961 | Grymer | 280/47.34 |
| 3,137,250 | 12/1969 | Hutchison | 280/47.34 |
| 3,841,651 | 10/1974 | Bigney | 280/47.16 |
| 4,398,768 | 8/1983 | Parks et al. | 280/47.16 |
| 4,488,733 | 12/1984 | Hellsten | 280/47.16 |

FOREIGN PATENT DOCUMENTS 484469 9/1953 Italy .................................. 280/47.16

Primary Examiner—David M. Mitchell
Assistant Examiner—Richard Camby
Attorney, Agent, or Firm—Roy E. Mattern, Jr.

[57] ABSTRACT

The cart of the present invention is used to transport planar materials such as plywood and drywall through a person size doorway. The transported material is in an upright position supported by a removable vertical side support on a planar elongated frame. The planar elongated frame is larger in the center and tapers inwardly at each end to about half its central width. The central portion of the cart has two large wheels on a transverse axle while the tapered ends each have central casters. The removable vertical side support has three receivers in the upper surface of the planar elongated frame. One of each of the three members of the vertical side support is received in each of the middle and tapered end sections, respectively. The three members meet and form an arched shape with an off-set central member.

8 Claims, 3 Drawing Sheets

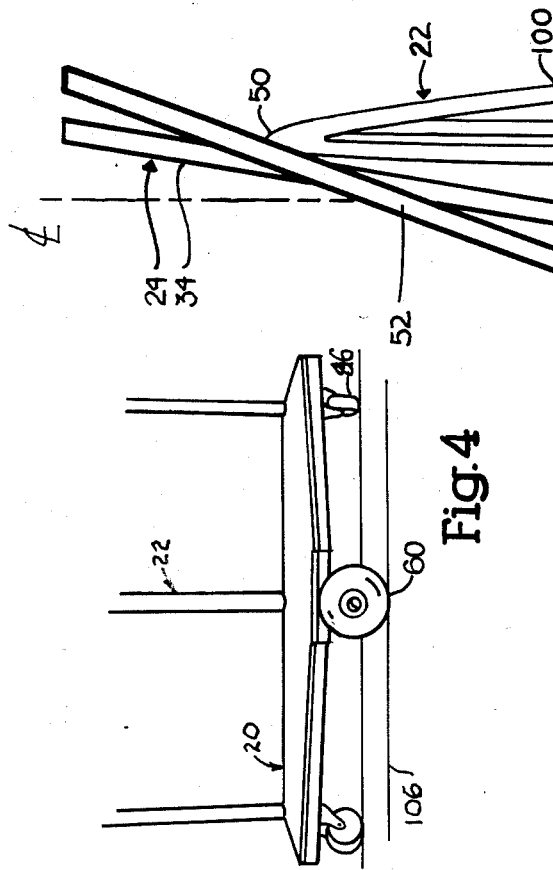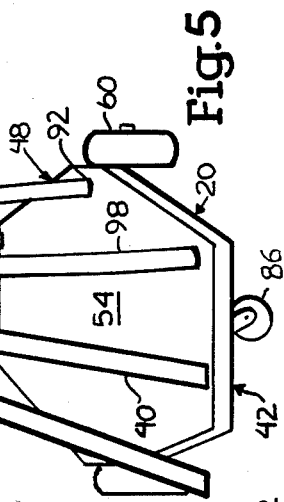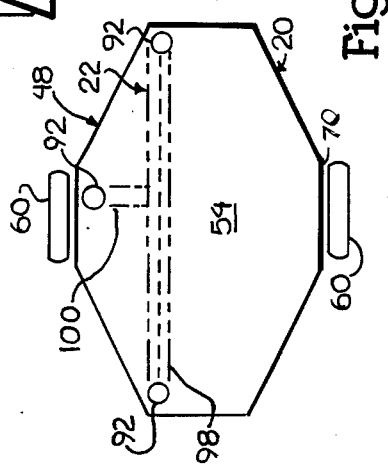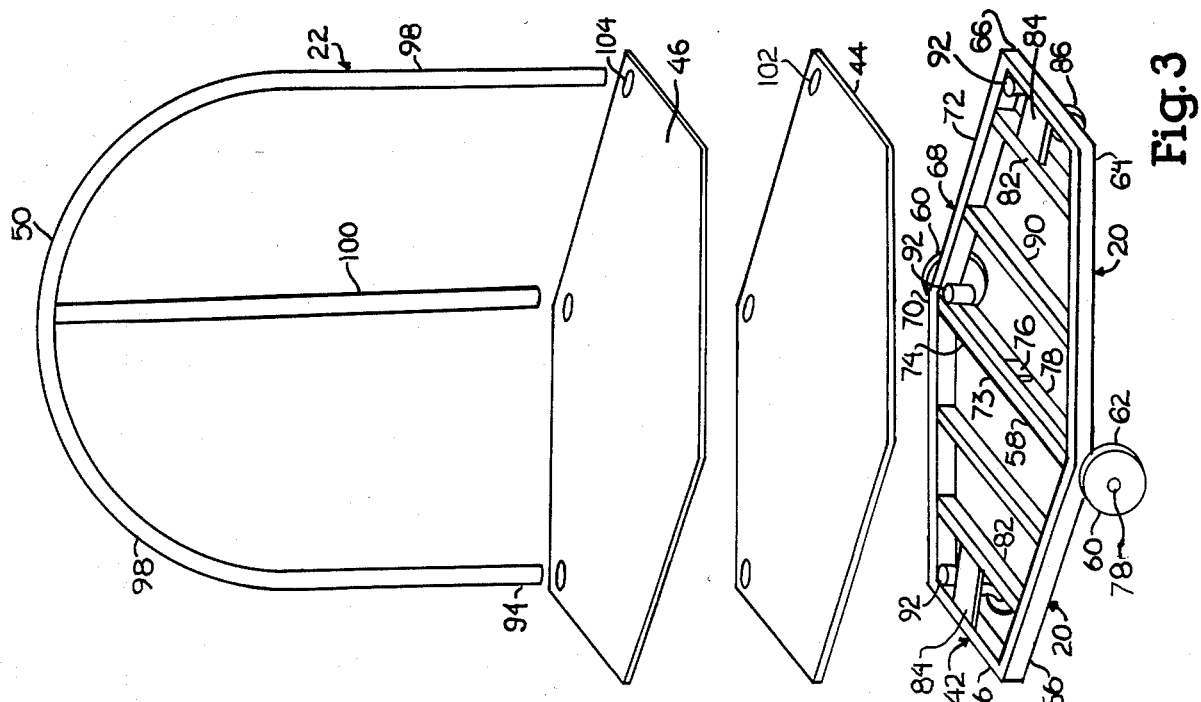

SMALL, LIGHTWEIGHT, STRONG, MULTIPLE USE CART HAVING A REMOVABLE VERTICAL SUPPORT FOR MOVING HEAVY ITEMS IN OR OUT OF DWELLINGS VIA A PERSON SIZE DOORWAY

BACKGROUND

In the wood stove industry, before installing wood stoves, it is common place to use precast non-combustible panels, consisting mainly of cement as the immediate supporting structure, and often also as a nearby upstanding panel serving as a nearby wall structure. In the past these heavy precast non-combustible panels were essentially handled by hand and by using inadequate carts. When being delivered to the marketplace, or to a home, these heavy panels must be passed through person sized doorways, and over thresholds, and maneuvered through narrow passageways. Also their handling at distributors' facilities, and their handling at the manufacturer's facilities is oftentimes equally inconvenient. Persons moving these members, especially the non combustible panels, are often hurt, many of them incurring back injuries.

In searching the marketplace and also information sources, such as United States patents, no carts were found which were considered suitable. Of many patents reviewed, some were noted as directed to carrying dwelling construction materials. Mr. Aksel F. Grymer in his U.S. Pat. No. 3,003,788 of 1961 disclosed his glazier's truck for moving plates of glass to required locations in a building under construction. His planar rectangular platform has removable longitudinal side vertical supports used in positioning the glass plates on their edge and at an angle. Two larger diameter transversely spaced non castering wheels are secured underneath the planar rectangular platform, at one end, and two smaller diameter castering wheels are secured underneath this platform at the other end and positioned, so this platform remains horizontal on a level surface.

Mr. Stephen W. Bigney in his U.S. Pat. No. 3,841,651 of 1974, disclosed his wheel mounted, support platform, hand truck for moving building sheet material, such as plywood and drywall at a work site. His comparatively narrow elongated rectangular support platform has a longitudinal side vertical support secured at places which are aligned along one side of the support platform. Two large wheels on a transverse axle are secured to the central section of the support platform. Portions of each of these two large wheels are higher, during their rotation and while standing, than the support platform. The drywall and/or plywood panels are closely arranged adjacent to the longitudinal side vertical support, being kept essentially vertical. They are so held in his edge supported vertical position by a top horizontal hook selectably vertically positioned on the longitudinal side vertical support. There are secondary wheels of smaller diameter which do not touch the ground nor the floor, when the support platform remains level. However when the support platform is not is use, or when it is in use and a threshold of a doorway is being crossed, then one of these secondary wheels touches the ground or floor to compete a three wheel support of this support platform hand truck.

Mr. Tord M. Hellsten in his U.S. Pat. No. 4,488,733 disclosed his wheeled plate carrier, for transporting building boards. He provided an elongated base, supported, while at an angle, on one large wheel at its central section, and on respective small wheels at each end. The latter small wheels were on extended arms, making a three wheel support of this elongated narrow base. Once underway, however, the elongated narrow base became horizontal, and its perpendicular frame became upright. Also, when underway, generally only the large wheel was supporting the building boards. The perpendicular frame was equipped with a handle bar, and also a combined hook and strap subassembly used in holding the top edges of the building boards closely adjacent to the upright frame, so they remained closely positioned adjacent the upright frame throughout their then upright width.

In summary, although Mr. Grymer illustrated his glazier's truck, on which glass was carried into dwellings, while supported at an angle, and the sides of the truck were removable, he did not indicate a truck having larger wheels, which would be the only wheels supporting the load, if the support platform remained level. Mr. Bigney illustrated his very narrow hand truck which supported sheet material in a vertical position and he did indicate using larger wheels, which would be the only wheels supporting the load, if the support platform remained level. Mr. Hellsten illustrated his wheeled plate carrier, which supported building boards adjacent an upright support, which at rest was at an angle, and which underway was upright. The single large wheel and the two offset small wheels were all in contact with a floor, when the upright support was at an angle. However, only the single large wheel was in contact with a floor, when the upright support was vertical.

These products of Messrs. Grymer, Bigney and Hellsten, are recognized for their operational benefits. However, when the often larger, and heavier, and more irregular non combustible supports and non combustible panels, used with wood stoves, and wood stoves themselves, are to be transported, then another cart is needed.

SUMMARY

A multiple use, multiple configuration cart is used by personnel who must safely and conveniently handle and transport, non combustible supports and non combustible panels for wood stoves, and also the wood stoves and accessories. The cart is small, strong, lightweight and equipped with a removable vertical support. The support platform of this cart is narrow enough to pass through a person size doorway. Central wheels and end casters of the support platform, permit the utilization of only the central wheels, when the support platform is level, while underway and/or the utilization of the central wheels and one or the other of the fore or back castered wheels, when the support platform is tilted longitudinally, when the cart is being conveniently moved over thresholds and other raisers.

The removable vertical support has an inherent braced configuration, wherein three legs are inserted into the support platform in receivers which are not aligned. This stable inserted removable vertical support together with the strong support platform, positions the heavy non combustible supports panels, so their combined center of gravity is over the longitudinal center and transverse center of the cart. As so positioned on the support platform of a subassembly of a frame, wood cover, and in turn a carpet cover, these heavy supports and heavy panels are guided, via this cart, through a person size doorway and over the threshold.

Subsequently, after the heavy supports and panels are installed, then the vertical support is removed and this cart is used during the delivery of the wood stove and its accessories. Also this cart is available for use by other persons, such as installers of drywall, who conveniently load drywall panels on this cart, or by persons installing wood panels, or by persons delivering appliances. Such loads are carried conveniently because the wheels and casters do not extend above the support platform. Therefore objects may be loaded from the side, and also large loads, such as desks and tables are moved by using this strong lightweight support platform.

Preferably, the support platform has narrower ends for guided entry through doorways and passing by possible partial temporary obstructions. Also the vertical support is curved to avoid the otherwise possible effects of causing damage by the presence of sharp corners. Preferably, the overall weight of the cart is thirty seven pounds, and yet the cart is strong enough to carry one thousand pounds. With the vertical support removed and laid over the support platform the vertical height is only seven inches. The preferred proportions, in respect to the transverse width of the support platform, which is governed by the width of a person size doorway and the wheels, are: the support platform length is one and one half times the transverse width; the end widths are one half the transverse width; and the removable side support height is one and one half times the transverse width. As so proportioned, constructed, and utilized this cart serves many of the past functions served by carts of other designs and also serves many new functions not previously served by carts of other designs.

DRAWINGS

The small, lightweight, strong, multiple use cart having a removable vertical support, for moving heavy items in and out of dwellings through a person size doorway is illustrated in the drawings, wherein:

FIG. 3 is an exploded perspective view of this multiple use cart to illustrate the construction and assembly of the components thereof;

FIG. 4 is a partial enlarged perspective view of this multiple use cart to indicate the positioning of the main transverse wheels of larger diameter, which are always in contact with the ground or floor when the cart is loaded, and to indicate the end swivel casters of smaller diameter, which do not touch the ground or floor, until the cart is tilted, and then only one at a time;

FIG. 5 is an end view further illustrating how the removable vertical support is formed and installed to position the heavy panels being carried, so they in turn have their center of gravity located over the center of the cart, and the loaded cart will not tip over;

FIG. 6 is a top view, illustrating how the removable vertical support is formed and installed, in its brace configuration, using non aligned receivers in the support platform, with the removable vertical support being shown in phantom lines to indicate the non aligned receivers and to indicate it is removable;

DESCRIPTION OF THE PREFERRED EMBODIMENT

How the Multiple Use Cart is Used

Figure 1:
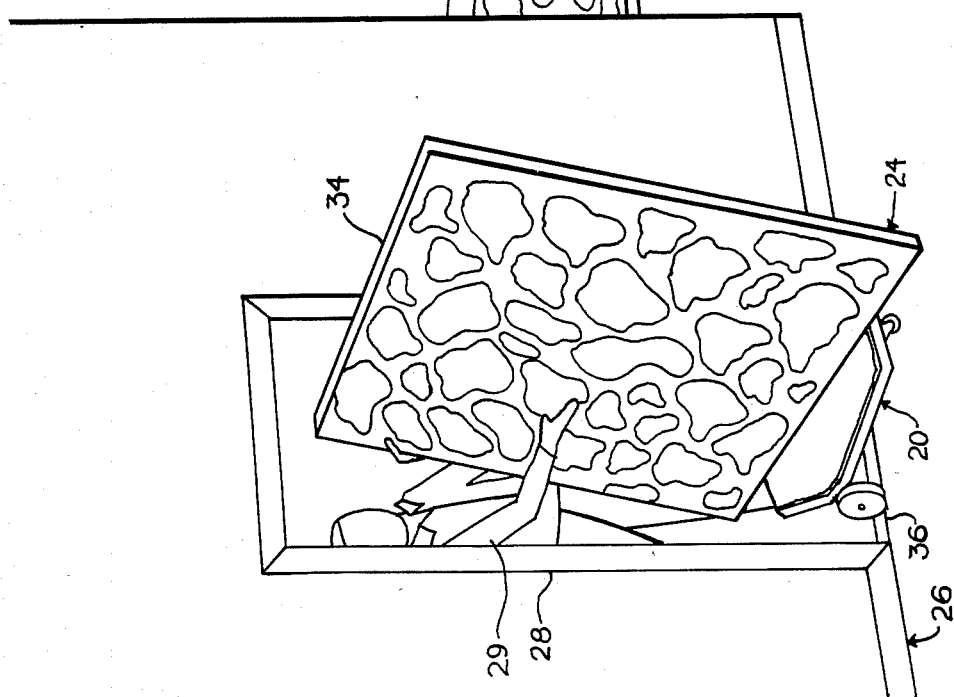
FIG. 1 is a perspective view of a person using this multiple use cart, with the removable vertical support in place, to bring a non combustible wall panel through a person size doorway into a dwelling to be placed behind a wood stove installed on a non combustible support panel, both of which have been previously carried on this cart.

The preferred embodiment of the small, lightweight, strong, multiple use cart 20, having a removable vertical support 22, for moving heavy items 24 in or out of dwellings 26, via a person size doorway 28, is illustrated in FIG. 1, when this cart 20 is being used by a person 29 to install a wood stove 30 in a home 26. A heavy reinforced cast concrete and stone floor panel 32 was first carried in using this cart 20. Then the wood stove 30 was carried in and placed on the floor panel 32. Subsequently, the heavy reinforced cast concrete and stone wall panel 34 is being carried on the multiple use cart 20, over the threshold 36, and through the person size doorway 28, en route to the wall space 38 located behind the wood stove 30.

Loading the Multiple Use Cart

Figure 2:
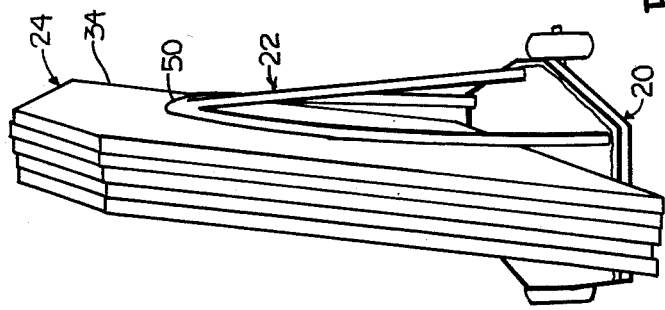
FIG. 2 is a perspective view showing another heavy non combustible support panel positioned on this multiple use cart, whereby its center of gravity is over the center of this cart and the removable vertical support insures this heavy panel remains so centered to avoid any tipping of combined panel and cart.

As shown in FIGS. 2 and 5, a heavy item 24, such as a pre-cast non-combustible panel, i.e. cast floor panel 32 or cast wall panel 34, is placed with bottom edge 40 resting on a planar elongated frame 42, which preferably is securely covered first by a wood product 44 and then by a carpet or rug 46, as shown in FIG. 3, to complete this platform assembly 48. Then the heavy item 24 is tilted to rest or lean against the curved top 50 of the removable vertical support 22. In this position the center of gravity 52 of the heavy item 24, when it is a precast non-combustible panel 32, 34 or other item, is positioned over the central area 54 of the platform assembly 48 of the multiple use cart 20 under very stable load transporting conditions.

The Construction and Arrangement of the Components of the

Multiple Use Cart

The construction and arrangement of the multiple use cart 20 is illustrated in FIG. 3, where many of the components are shown in their just before assembly position. The planar elongated frame 42 is made using steel channel members 56 having a maximum central width 58 of more than one half the width of a person sized doorway 28, while still providing a clearance to position the larger diameter wheels 60, which in turn still leave a clearance within this doorway 28. The objective is to have the overall width 62 approach the width of this doorway 28, yet to leave a convenient clearance.

The longitudinal length 64 of the planar elongated frame 42 is at least one and one half times the maximum central width 58. The like ends 66 of this frame 42 are about one half the width of the central width 58. The like overall sides 68 of the frame 42 have short straight portions 70 at the sides of the central area 54, then tapering portions 72 continuing to the ends 66 of the planar elongated frame 42. By using this tapered construction, when the multiple use cart 20 is being moved through a doorway 28 or nearby any object, if contact is made, then the reactive force serves to help in redirecting the multi use cart 20 through a doorway 28 or past an object.

Figure 7:
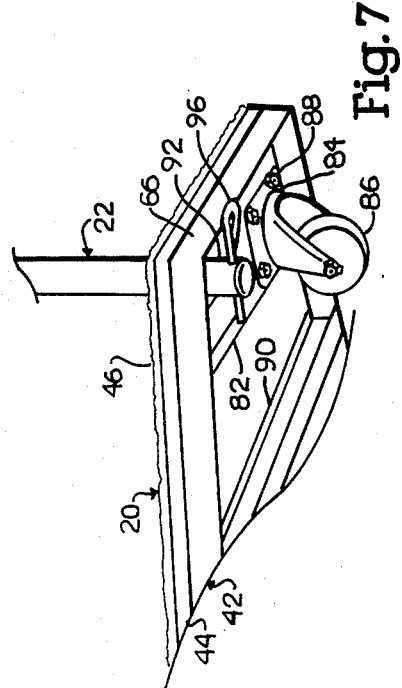
FIG. 7 is a partial enlarged perspective view of one end of this multiple use cart to show how the removable vertical support is temporarily secured, using removable transversely inserted fasteners, and to show the mounting of the swivel casters.

The central cross frame member 73 has depending side axle supports 74 and a depending central axle support 76 to position the transverse axle 78. The larger diameter wheels 60, are mounted on axle 78. Near each end 66 of the frame 42, is a near-end cross frame member 82. As shown in FIGS. 3 and 7, a caster wheel mounting plate 84 is secured centrally between each respective end 66 and each respective near-end cross frame member 82. Pivotal small diameter casters 86 are in turn secured, with fasteners 88, to these caster wheel mounting plates 84. Mid cross frame members 90 complete the framing members of the planar elongated frame 42.

Three alike cylindrical receivers 92 are secured to the frame 42 along one side thereof. There is one receiver 92 at each end 66, and one receiver 92 at the central cross frame member 73. They receive the respective insertable ends 94 of the removable vertical support 22 and then larger cotter like pins 96 temporarily secure these ends 94 in place in these receivers 92, as shown in FIG. 7.

The removable vertical support 22 as shown in FIGS. 2, 3, and 5, is the integral arrangement of a planar curved bar 98 commencing at one insertable end 94 at one end 66 of the planar elongated frame 42, then passing upwardly to create the curved top 50, and then returning to another insertable end 94 at the other end 66 of the frame 42, and a diagonal straight bracing bar 100, extending from the curved top 50 down to an insertable end 94 to be held in the receiver 92 located at the central cross frame member 73. This configuration of the removable vertical support 22, removably secured in the non aligned cylindrical receivers 92, provides an overall very stable and strong support 22, to in turn receive part of the positioning weight of the heavy items 24, such as a pre-cast non-combustible wall panel 34, as shown in FIGS. 2 and 5. This removable vertical support 22 extends upwardly at least one and one half times the dimension of the central cross frame member 73, i.e. the central transverse width of the platform assembly 48.

The planar elongated frame 42, is covered by a wood product 44 such as a wafer board or plywood, removably secured thereto by fasteners, not shown, so it may be replaced when worn. The wood product 44, in turn is covered by a rug or carpet 46 secured in a way, not shown, to be easily replaced when worn. Both the wood product 44 and the rug or carpet 46 have respective holes 102, 104, to continue the clearance for the insertable ends 94 of the removable vertical support 22 to fit down into the cylindrical receivers 92.

Relative Positioning of the Larger Diameter Wheels and the Smaller Diameter Casters As particularly shown in FIG. 4, the relative positioning of the larger diameter wheels 60 and the smaller diameter casters 86, insures that when the platform assembly is level, only the larger diameter wheels 60 will be in contact with the ground, pavement, sidewalks, or floor 106. Then when the multi-use cart 20 is stopped and at rest, one or the other of the smaller diameter casters 86 will be in contact with the ground 106. Also when a threshold 36 is approached, the smaller diameter caster 86, then at the rear of the cart 20, is in contact with the floor 106, and the then forward smaller diameter caster 86, at the front of the cart 20, is cleared up and over the threshold 36. The tilting of the platform assembly 48 is thereafter reversed to clear the then rear small diameter caster 86 up and over the threshold 36. When quick turning of the multi use cart 20 is undertaken, then the selected alternate use of one or the other of the smaller diameter casters 86 in conjunction with the larger diameter wheels 60 makes such quick turning very convenient.

Figure 9:
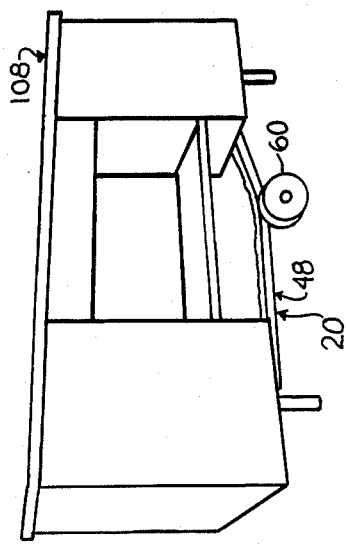
FIG. 9 is a perspective view of this multiple use cart, with the vertical support removed, during the moving of an office desk.
Figure 8:
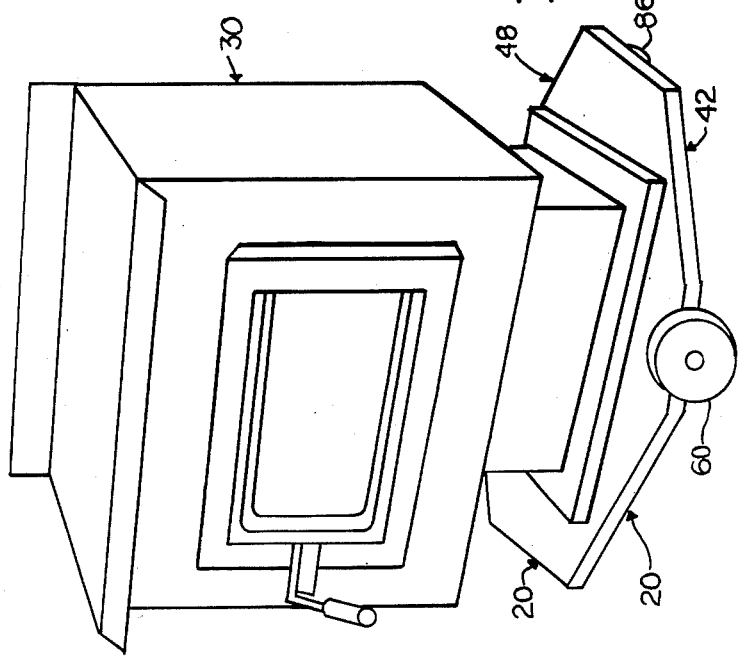
FIG. 8 is a perspective view of this multiple use cart, with the vertical support removed, during the moving of a wood stove.

The Multiple Use Cart, With the Removable Vertical Support Removed, is Used to Move Other Items of Considerable Weight As shown in FIG. 8, after removing the removable vertical support 22, the multiple use cart 20, is used to transport a wood stove 30. Also in a like configuration, this cart 20 is used to carry a desk 108, as illustrated in FIG. 9.

Convenient Non Use Storage Arrangement of the Multiple Use Cart

Figure 10:
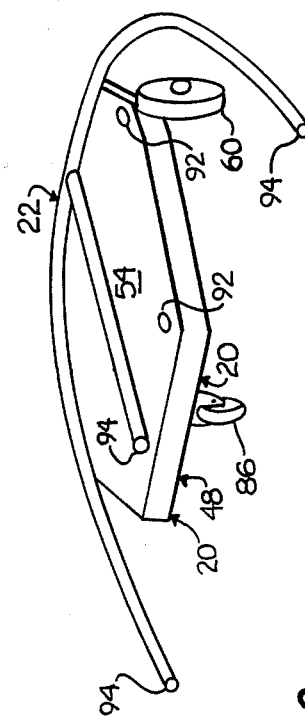
FIG. 10 is a side view of the multiple use cart with the vertical support removed and placed on the support platform during the convenient storage of the cart in a building or in a vehicle.

As illustrated in FIG. 10, when the multiple use cart 20 is not being used and is stored away in a dwelling 26 or in a vehicle, not shown, the removable vertical support 22 is withdrawn and then laid on top of the platform assembly 48.

Specification of a Specific Multiple Use Cart of This Preferred Embodiment

The overall weight of a specific multiple use cart 20 is thirty seven pounds. Yet this cart is strong enough to carry one thousand pounds. With the removable vertical support 22 removed and laid over the platform assembly 48, also referred to as the support platform 48, the overall vertical height is only seven inches.

The planar elongated frame 42 is made by welding portions of 1 inch by ½ inch steel channels together. The cylindrical receivers 92 are made from ¾ inch steel pipe. The removable vertical support is made by welding portions of ¾ inch steel pipe. The transverse axle 78 is made from a ⅝ inch round steel bar. The caster wheel mounting plates 84 are made from 3/16 inch steel plate. The axle supports 74 and 76 are made from ¼ inch steel plate. The larger diameter wheels 60 are 6.0 inches in diameter and preferably are made of a material which is self lubricating. The casters are three inches in diameter. The wood product 44 is 7/16 inch thick. The carpet or rug 46 is at least ⅛ inch thick. The cotter like steel pins 96 have a diameter of 5/32 inch. As so constructed, this specific multiple use cart 20 is used safely and conveniently to move the heavy items 24, such as the pre-cast non-combustible panels 32, 34, within the manufacturing facilities, within the dealer's business places, within dwellings, and during their transporting between these locations.

I claim:

1. A small, lightweight, strong, removable, vertical support, multiple use cart for moving heavy items in or out of dwellings through a person size doorway, comprising:

(a) a planar elongated frame having a central portion and respective narrowing end portions, a structural covering secured over the planar elongated frame, a carpet covering secured over the structural covering, and three non aligned planar supports secured to the planar elongated frame;

(b) spaced non directional wheels rotatably mounted transversely on the central portion and not rising above the structural covering;

(c) casters, having a smaller diameter than the non directional wheels, rotatably mounted longitudinally on the longitudinal centerline to the planar elongated frame, whereby only one will be in contact with a floor or the ground only when the planar elongated frame is tilted in passing over raised structures, such as a threshold; and (d) a vertical side support comprising three members which are removably fitted in the three non aligned planar supports of the planar elongated frame.

2. A multiple use cart, as claimed in claim 1, wherein the removable vertical side support has a curved member commencing from one of the planar supports located at the side of a respective narrowing end portion and extending up above the central portion, and then returning to another of the planar supports located at the side of the other respective narrowing end portion, and a brace straight member commencing from the third planar support located at the side of the central portion and slanting inwardly and upwardly joining the curved member at a maximum height location.

3. A small, lightweight, strong, multiple use cart having a vertical side support for moving heavy items in or out of dwellings through a person size doorway, comprising:

(a) a planar elongated frame having three non aligned receivers to removably receive a vertical side support;

(b) spaced wheels rotatably mounted transversely and centrally to the planar elongated frame;

(c) casters rotatably mounted longitudinally on the longitudinal centerline to the planar elongated frame; and (d) a vertical side support, secured to the planar elongated frame, which has one member extending from one non aligned receiver to another non aligned receiver, which is the farthest away, and another member extending from the remaining non aligned receiver up to the top of this vertical side support.

4. A small, lightweight, strong, multiple use cart having a vertical side support for moving heavy items in or out of dwellings through a person size doorway, comprising:

(a) a planar elongated frame having a central portion and respective narrowing end portions, and having three non aligned receivers with two of them being positioned in the narrowing end portions and one being positioned in the central portion;

(b) spaced wheels rotatably mounted transversely and centrally to the planar elongated frame;

(c) casters rotatably mounted longitudinally on the longitudinal centerline to the planar elongated frame; and (d) a vertical side support, comprising three members which are removably recieved by the three non aligned receivers.

5. A small, lightweight, strong, multiple use cart, as claimed in claim 4, wherein the vertical side support has one member extending between the two receivers positioned in the narrowing end portions and another member extending from the receiver portion up to the top of this vertical side support.

6. A small, lightweight, strong, multiple use cart, as claimed in claim 4, wherein the spaced wheels rotatably mounted transversely and centrally are of a larger diameter than the diameter of the casters rotatably mounted longitudinally, whereby when the planar elongated frame is level, the casters do not contact the surface below the cart, and when the frame is not level, one of the casters will be in contact with the surface below creating a three point support for the tilted cart in conjunction with the larger diameter transversely spaced wheels.

7. A small, lightweight, strong, multiple use cart, as claimed in claim 6, wherein a structural covering is secured over the planar elongated frame and has holes located over the non aligned receivers.

8. A small, lightweight, strong, multiple use cart, as claimed in claim 7, wherein a carpet covering is secured over the structural covering and has holes located over the non aligned receivers.

* * * * *